(12) United States Patent
Darlington

(10) Patent No.: US 9,445,557 B2
(45) Date of Patent: Sep. 20, 2016

(54) IN-ROOM HYDROPONIC AIR CLEANSING UNIT

(71) Applicant: NEDLAW LIVING WALLS INC., Guelph (CA)

(72) Inventor: Alan Blake Darlington, Guelph (CA)

(73) Assignee: Nedlaw Living Walls Inc., Breslau, Ontario (CA)

( * ) Notice: Subject to any disclaimer, the term of this patent is extended or adjusted under 35 U.S.C. 154(b) by 129 days.

(21) Appl. No.: 14/204,364

(22) Filed: Mar. 11, 2014

(65) Prior Publication Data
US 2014/0283450 A1 Sep. 25, 2014

(30) Foreign Application Priority Data

Mar. 19, 2013 (GB) .................................. 1304996.0

(51) Int. Cl.
*A01G 31/00* (2006.01)
*A01G 31/02* (2006.01)
*F24F 3/16* (2006.01)

(52) U.S. Cl.
CPC ....... *A01G 31/02* (2013.01); *F24F 2003/1653* (2013.01); *Y02P 60/216* (2015.11)

(58) Field of Classification Search
CPC .... A01G 31/02; A01G 31/06; A01G 31/047; A01G 13/08; A01G 1/001; A01G 9/00; A01G 9/022; A01G 27/00; A01G 27/006; F24F 3/16; F24F 3/1603; F24F 3/1607; F24F 3/161; F24F 2003/1653; F24F 2006/005

USPC .................. 47/62 A, 82, 66.7, 65; 435/292.1
See application file for complete search history.

(56) References Cited

U.S. PATENT DOCUMENTS

| | | | | |
|---|---|---|---|---|
| 4,250,666 A * | 2/1981 | Rakestraw | ............. | A01G 7/045 211/131.1 |
| 4,594,811 A * | 6/1986 | Tokoro | ................... | A01G 31/06 47/65 |
| 5,287,650 A * | 2/1994 | Moriguchi | ............ | E04D 11/002 47/59 R |
| 5,853,460 A * | 12/1998 | Alcordo | ............. | B01D 53/0407 55/385.1 |
| 6,061,957 A * | 5/2000 | Takashima | ............. | A01G 31/02 47/21.1 |
| 6,727,091 B2 * | 4/2004 | Darlington | ............. | B01D 53/85 435/292.1 |
| 8,758,680 B2 * | 6/2014 | Hishida | ................... | A61L 9/122 261/91 |
| 2009/0064858 A1* | 3/2009 | Mazzanti | ............... | B01D 53/85 95/149 |
| 2009/0151244 A1* | 6/2009 | Jesness, III | .......... | A01G 27/006 47/65 |
| 2013/0212940 A1* | 8/2013 | Blyden | .................. | A01G 9/022 47/65.8 |
| 2013/0255152 A1* | 10/2013 | Johnson | ................. | A01G 31/06 47/62 C |

* cited by examiner

*Primary Examiner* — Joshua Huson
(74) *Attorney, Agent, or Firm* — Anthony Asquith Corp.

(57) ABSTRACT

The unit arranges plants around a media-cylinder in a vertical hydroponic configuration. The unit passes room-air over the roots of the plants, and significantly cleanses the air in a large room of contaminants. The unit is placed to receive light from e.g a window of the room. The unit includes provision for rotating the media-cylinder about a vertical axis, to ensure even illumination of all the plants around the media-cylinder.

19 Claims, 3 Drawing Sheets

IN-ROOM HYDROPONIC AIR CLEANSING UNIT

This technology relates to the removal of airborne contaminants in room-air, by passing the room-air over the roots of hydroponic plants. It is developed from technology disclosed in patent publication U.S. Pat. No. 6,727,091.

In that patent, plant roots are embedded in a porous and inert air-permeable medium, and the room-air passes through the inert medium and over the hydroponically-wetted roots. Arranged as described therein, bacteria colonies that thrive on the roots draw contaminants out of the passing air, and break them down. The present technology continues these functions, and aims to improve the efficiency of the unit and thus enable a reduction in the expenditure of resources needed for the achievement of a given level of air-treatment performance.

Cultivation of e.g vegetables and flowers for sale, done hydroponically, can require (expensive) provision of intense artificial light. However, hydroponic cultivation of house plants (at a lower rate of metabolism) can be done, using just the light available from the window(s) of the room. The resulting simplicity and reduced use of resources (as to provision of the hydroponic apparatus, and as to running costs) is advantageous.

As disclosed in '091, the plants are placed in what may be termed a vertical hydroponic configuration. The roots of the plants are enmeshed in a media material of preferably fibrous non-biodegradable plastic fibrous media material. Generally, the fibrous material is woven and matted loosely enough that the material has only a small structural strength—but is sufficient to support the plants in that, in operation of the apparatus, the media material hangs as a vertical sheet.

As disclosed in '091, air is drawn by mechanical means through the fibrous media material, and over and through the roots of the plants embedded in the material. Colonies of microbes on the roots act to break down the contaminants in the air. Even a single pass-through of the room-air can effect a measurable reduction in airborne contaminants. When the air is enclosed (as in a room) and the air is circulated and recirculated through the media, and over the roots repeatedly, impressive reductions in airborne organic contaminants can be achieved.

In the units described herein, the plants can be rotated in order to even out exposure to available light. The rotation is done about a vertical axis.

LIST OF THE DRAWINGS

Figure 1:
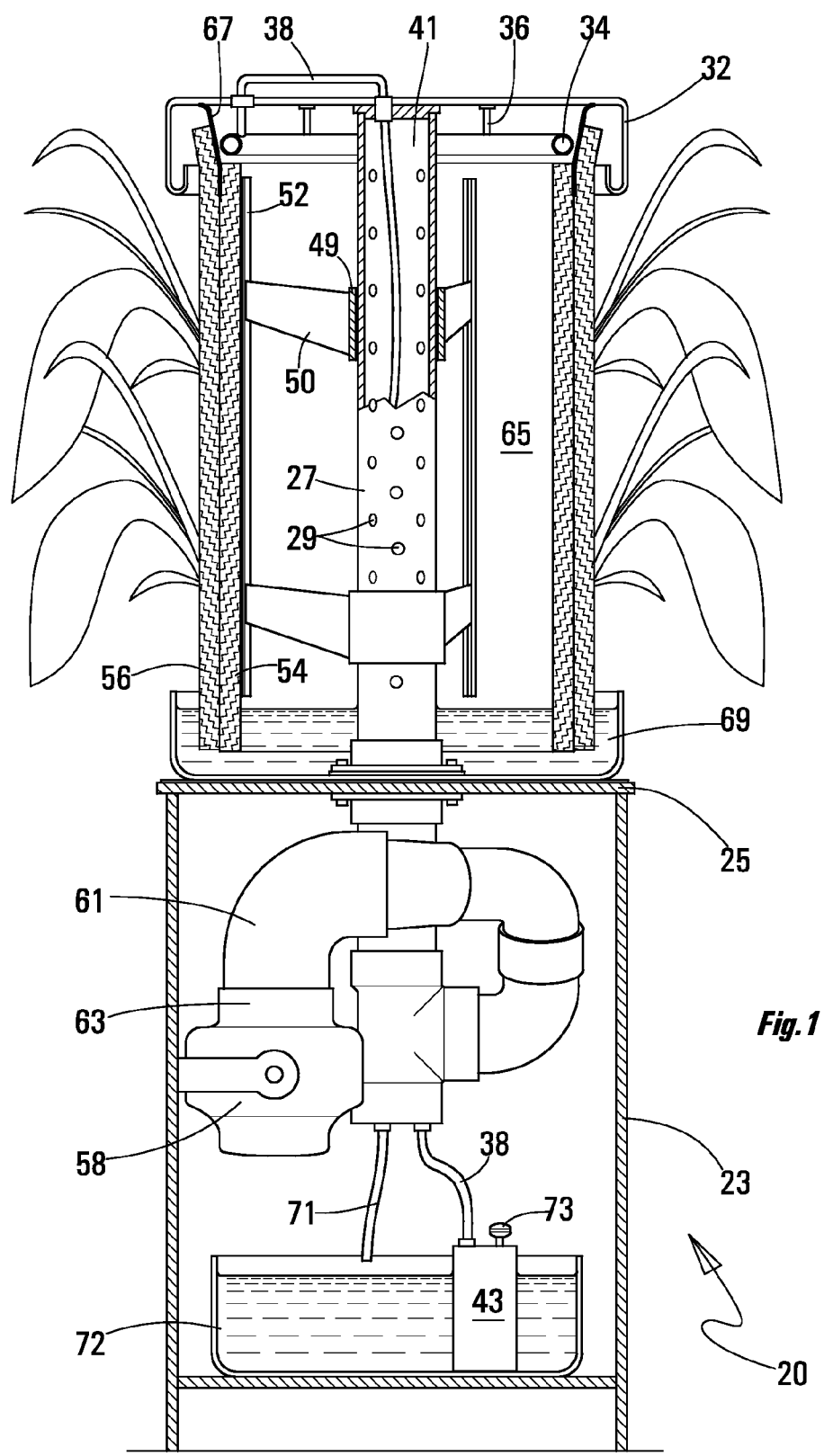
FIG. 1 is a sectioned side-elevation of an in-room hydroponic air-cleansing unit.

The in-room hydroponic air-cleansing unit depicted in FIG. 1 stands 180 cm high, and occupies a 60 cm-square floorspace. The unit contains plants, the roots of which are embedded in an air-permeable media material. The plants are located all around the outside of a floor-standing structure. The unit provides for the plants to be rotated, to promote evenness of illumination of the plants from a window of the room.

The unit includes a powered water-circulation system, by means of which the media material is kept wetted with nutrient-containing water. The unit includes also a powered air-circulation system, by means of which room-air is drawn into the unit, and is passed over and through the roots of the plants, after which the treated air is discharged back into the room. Impurities in the air are drawn out of the air by microbes that colonize the wet roots.

The unit 20 includes a floor-standing cabinet 23. Fixed into a table-top 25 of the cabinet 23 is an upright circular right-cylindrical plastic tube 27. The wall of the tube 27 is perforated with air-holes 29. A fixed top-assembly is fixed on top of the tube 27. The top-assembly includes a cover 32, and includes a water distribution ring 34, which is mounted from the cover 32 by means of ring-hangers 36. The water ring 34 is supplied with water from a water supply pipe 38. The pipe 38 passes up inside the hollow interior cavity 41 of the fixed upright tube 27 from a water pump 43.

The cylindrical tube 27 is firmly fixed to the table-top 25. Supported from the fixed tube 27 is a rotatable assembly of the unit 20. The rotary assembly is based on a rotor-frame, which comprises hubs 49, spokes 50, and upright bars 52. These components are attached together in such manner that the frame is an integrated rigid structure, which is capable of rotating, as a structure, about the fixed tube 27.

The rotary assembly includes inner and outer cylinders 54, 56, which are attached to the rotor-frame. The cylinders 54, 56 are formed from respective flat sheets or mats of media material. The flat sheets are curled around to form the two cylinders, and the edges stitched together. The stitching should done tightly enough that there can be no significant leakage of air through the stitched joint. The media material itself is air-permeable, and the joint should be made in such manner that the air passes preferentially through the media, rather than through the joint. The cylinders should be sized such that, when the cylinders are assembled, the outer cylinder is under a slight stretch, to discourage radial gaps between the two cylinders.

If the designers wish to avoid stitching the cylinders of media material, they can arrange for the ends of the sheets that make up the cylinders to engage into back-to-back channels. In that case, there would be a narrow band of the circumference of the media material (where the channels are) in which there are no plants. The designers might also prefer to make the cylinder out of two or more pieces of sheet material, in which case there would be two or more joints. Preferably, the cylinders are so formed that the plants can be placed all around the whole circumference of the cylinders, without interruptions.

The media cylinders 54, 56 are bolted to the bars 52 of the rotary frame. The bars 52 are of channel-profile. The number of upright bars 52, and the number of bolted attachment points, is set according to how many points are needed to ensure that the media cylinders 54, 56, laden with plants, retain their cylindrical shape, over a long service life. From this standpoint, no location within the media material should be more than forty cm from a bolted attachment point.

The rotary frame may include a mesh of e.g plastic netting, like a trellis, to which the porous or fibrous media material is attached, where the material itself lacks the structural strength or rigidity to support the plants over a long service life.

Plants are attached into the media material in that the plant roots are embedded in the fibres of the media. A person can insert the plant roots into the media material by cutting the fibres of the outer cylinder and forming a small pocket between the two cylinders and gently pushing the roots between the two cylinders of media-material. When the fibres are released, the fibres spring back and exert a grip on the roots.

With practice, a plant-fitter can complete the task of embedding the roots of the required number of plants, without damaging the plant or the media, and in a horticulturally and mechanically secure manner, in reasonably short order. Typically, the embedded roots will, at first, remain between the two cylinders, but then, as the roots spread out, they will spread radially into and through the inner and outer cylinders 54, 56 as the plant grows and develops.

The plant-fitter should take care to space the plants more or less evenly over the whole exposed outer surface of the outer cylinder 56. It is important also that the plants be selected for their ability to grow and develop in such manner that the roots tend to form a mat of a more or less uniform permeability, over the whole air-exposed surface of the cylinders. Generally, it is not necessary to include only one species of plant in the unit, in order to achieve the preferred uniformity of permeability.

In the FIG. 1 unit, the rotary assembly is rotatable in that a person can rotate the assembly by hand, i.e by grasping the assembly and moving it through an arcuate angle. The rotary assembly includes the cylinders 54, 56, and the plants embedded therein.

Plants depend on light for photosynthesis. Often, hydroponic cultivation is used for the commercial operation of growing flowers or vegetables to maturity for harvest, basically as rapidly as possible. The required high rate of photosynthesis in these operations means that hydroponic cultivation is characterized by the need to provide super-intense artificial light. In the present case of the in-room hydroponic air-cleansing unit 20, the plants are simply maintained, rather than grown rapidly for harvesting. As such, it is possible for the natural light from a single window to be all that is needed to maintain the plants.

The plants in the unit 20 extend all around the circumference of the media cylinder 56. Rotating the plants (done sensibly) enables all the plants to receive a good share of the available lighting. The unit 20 is not intended for hydroponic installations where the plants are surrounded by very bright lights. The unit 20 is intended as a unit that functions well under the kind of available uneven lighting typically encountered in windowed rooms in buildings.

Again, the present technology is of benefit when the lighting that falls on the unit and the plants is uneven—which can occur with artificial lighting or with windows. In the case of artificial lighting, the technology eases the need for the lamps to be arranged to provide even illumination all around the unit.

The ability to rotate the rotatable assembly means that the unit designer can provide for the occupants to be able to arrange for the plants all to receive equal exposure to the light from the window. The ability to rotate also permits all the plants in turn to be presented visually to the occupants of the room, which adds to the appeal of the unit.

The air-circulation system includes a powered fan 58, mounted in the cabinet 23. Air ducts 61 connect the inlet port 63 of the fan 58 to the interior cavity 41 of the fixed tube 27.

The fixed tube 27 is formed with many perforated holes 29, through which air is drawn into the cavity 41. When specifying the size, number, and configuration, of the perforations 29, the designers' aim should be to encourage an evenness and uniformity of the airflow therethrough, over the whole area of the tube that is contained within the cavity 41.

The likelihood of evenness is improved if there is a significant pressure difference between the air in the vault 65 (being the annular vault that lies between the inner media cylinder 54 and the fixed tube 27) and the air in the cavity 41. Thus, the air-holes 29 in the tube 27 should be so sized as to provide, in association with the output of the fan 58, a suction head, between vault and cavity, of at least eight millimeters of water.

The volumetric flowrate of air being drawn in through the perforations near the top of the tube 27 should be the same as the flowrate of the air being drawn in through the perforations near the bottom. Given that the air is drawn out of the central tube from the bottom, the suction head that draws air into the tube cavity 41 from the vault 65 will be of greater magnitude at the bottom of the tube than at the top. If this top/bottom unevenness is seen to be significant, the designers should e.g provide more of the perforations 29 per unit area of the tube wall, near the top of the tube, to compensate.

Also, the designers should see to it that the airflow drawn in from the east sector of the cylinders 54, 56 should be the same as the airflow drawn in from the west sector. Encouraging evenness of airflow through the holes 29 encourages the airflow through the vault 65 to be even, which in turn encourages the airflow from the room into and through the outer media cylinder 56 to be even.

The airflow passes from the cavity 41 through the ducts 61, through the fan 58, and leaves the fan through an outlet port. The treated air is blown out into the room in a suitable manner. For example, the air can be blown out through an opening or grating 66 (FIG. 3) in a wall of the cabinet 23. The discharged air is likely to be of elevated humidity, so care might be needed in the placement of the unit in relation to walls, furniture, etc.

All the air entering the vault 65 should be air that has passed through the media and has been in contact with the roots of the plants. Any air that enters the vault without passing over the roots does not get treated, which is inefficient. The rotatable media cylinders 54, 56 are sealed to the fixed top-cover 32. A rotating rubber strip 67 extends upwards from between the cylinders and makes sealing contact with the underside of the cover 32, whereby air cannot enter the vault 65 by passing over the top of the cylinders.

The rotatable media cylinders 54, 56 are sealed at the bottom in that the cylinders dip into the water in a water-collecting basin 69. Water from the ring 34 enters the media cylinders, and passes over and through the roots of the plants embedded in the media material, and then trickles into the basin 69. Fixed into the basin 69 is a drain pipe 70 (FIG. 2), which is set to maintain the depth or level of water in the basin, such that the water is deep enough to cover the bottoms of the cylinders, whereby air cannot pass underneath the cylinders into the vault 65. The mouth of the pipe 70 may be located inside or outside the media cylinders, and the basin and drain should be so arranged so that the water level is the same inside and outside the vault.

The drain pipe 70 should be so arranged that the drain itself does not create an air-passage between the air in the vault and the air outside the vault. Thus, the bottom end of the drain pipe e.g should be below the level of the water in the reservoir 72 as in FIG. 2, or the drain-pipe should be located outside the media-cylinder, or the drain-pipe should include a U-bend.

The vault 65 is annular in shape, being bounded as to its outer circumference by the rotary media, as to its inner circumference by the fixed tube, as to its roof by being rubber-sealed to the top-cover 32, and as to its floor by being water-sealed to the basin 69.

Water draining from the collecting-basin 69 is collected in the water reservoir 72. As the nutrients in the water are taken up into the plants, the water becomes depleted. It is not the intent that the unit 20 should be connected to mains water-supply nor to mains drainage (although that is not ruled out). The designers may provide a depth sensor in the reservoir 72, to signal a low-water alarm to the occupants. The occupants can then respond be adding a pre-formulated bottle of nutrient water to the reservoir. Depending on the ambient conditions, the designers can easily arrange that the unit requires a prepared top-up bottle to be added e.g once a week or once a month—the period can vary depending whether the room air is warm/cold, dry/humid, etc, which affects the rate of loss of water by evaporation.

After a period of e.g a few months, the nutrient balance in the water might have strayed significantly from the ideal, and the designers can provide for simple routine service procedure to be done (by e.g the occupants) in which the unit 20 is shut down, and the used water is all emptied out and discarded and replaced with fresh nutrient water. The hydroponic water tends to become contaminated e.g with salts that are flushed out of the plant roots, and so the water would need to be changed every so often, even if replenishment of water and nutrients were done automatically.

The plants can be expected to last a long time, i.e years. When the individual plants do deteriorate, usually they can be replaced individually. Alternatively, the plants can be replaced wholesale, on a routine service program. In that case, the media cylinders would be replaced at the same time. The media material of the cylinders preferably is inert, and the media material is not used up (as soil would be used up). However, the media material does deteriorate mechanically over a period of time, in that it can tend to acquire a sag, at the places where the load on it is heaviest.

As mentioned, the water-circulation system includes the pump 43 and the supply-pipe 38, from which water enters the water-distribution ring 34. The ring 34 is perforated, such that water drips down out of the perforations, between and into the two cylinders of media material. The holes in the ring 34 should be equi-sized and equi-spaced, such that the distribution of water is even and uniform over all sectors of the cylinders.

It is not required that the roots of the plants must be kept constantly soaking wet. Thus, the water can be supplied to the cylinders in intermittent doses, rather than as a continuous stream or trickle, where that is more convenient. It would not be good for the plants if the roots were allowed to dry out, however. Also, the impurities in the air are drawn out of the air by the colonies of microbes that are established on the wet roots, and the viability of those colonies might be affected if the roots were to dry out.

Typically, a room in which the air is in need of being purified, is a room in a large building and the air supply to the room is not vigorous enough. (Sometimes, rooms in buildings can be characterized as 'stale', even though the overall ventilation of the building is apparently adequate.) If the room has windows, and if it is physically possible for the windows to be opened, and if opening the windows is acceptable to the occupants, then the air problems in the room can be addressed that way, and the described air-cleaning unit is not needed. The same applies if the room has an exterior door which is opened several times a day. The present unit is for use in cases where the room air circulation, or rate of ventilation, is not adequate to meet the occupants' requirements on a day-in-day-out on-going basis.

The present air-cleaning unit is intended for a room that has a window, in order to supply natural light. If the only available light is artificial, it is probable, given hydroponic light requirements, that the artificial lights would have to be so bright as to be uncomfortable to the occupants—and to be expensive in terms of the on-going need for electricity. Whether or not a window is sufficient depends on a variety of parameters; but a rough indication of sufficiency, in the case of an east-facing window, is that the window should have an area of more than two sq.m, in order to produce good results in the absence of intensely-bright artificial lighting.

Typically, the media cylinders 54, 56 are 40 cm in diameter, and 100 cm high. The portion of the outwards-facing area of the cylinders that is available for plants thus is a little over one sq.m. This plant-area should be related to the floor-area of the room in which the unit is located, and the aim should be to provide one square metre of plant-root-area for each hundred square meters of room floor area.

In order to ensure good hydroponic results, the rate at which water is supplied to the media cylinders, through the perforated ring 34, should be in the range 150 to 300 liters of water per hour, per metre of the circumference of the media-cylinder. It will be understood that the water flowrate should be related to the circumference of the out-facing plant-area of the outer cylinder 56—not to the thickness of the media, nor to the number of cylinders, nor to the height of the media-cylinder.

It would be difficult to supply different plants at different water-flowrates, so the plants should be chosen such that they all have more or less the same water-flow requirements.

It is important that the water be distributed evenly to all sectors of the circumferences of the cylinders. To this end, not only should the perforations in the ring 34 be evenly spaced over the ring, also the perforations themselves should all be identical.

The media material of the cylinders 54, 56 is coir (coconut fibre), or other suitable material. The material must be air-permeable, and should be fibrous or porous, to the extent that the roots of plants can become physically interwoven into the fibres or pores, whereby the media material provides mechanical or physical support for the plants.

The media material as used in the cylinders should have substantial mechanical strength and rigidity, as required for its role in providing physical support for the roots of the plants. Also, the material should be such that its strength and rigidity do not deteriorate over a long period of time. The sheet of the media material should be thick enough to provide proper mechanical support for the plant roots, but not so thick that the cylinders lose air-permeability. Putting numbers to the thickness of the cylinders, the combined radial thickness of the cylinders should be between two cm and four cm. Two cylinders, each of material that is two cm thick, may be expected to give good results.

Some of the root-supporting materials that are traditionally used in hydroponic horticulture, such as horticultural foam, or rock-wool, tend to break down after long periods of use. This does not matter so much in ordinary hydroponics, where the root-supporting material is discarded when the plant is harvested, after a growth period typically of a few months. However, the unit described herein is intended for long term use, using the same plants and the same media material. It is the intention that the plants and the media material should not have to be replaced every year. Also, it can be difficult, with some media materials, to achieve a good balance between required physical strength and required high permeability.

Thus, in order for the present unit to perform to its best economic advantage, the root-supporting media material should not be the typical material used for commercial hydroponic horticulture. A material that is subject to structural changes in its physical characteristics over time, or is generally mechanically fragile, is not likely to be suitable for use as the root-supporting media material in the air-cleansing unit as described herein. The material would be unsuitable not least because the diminishment of properties would be uneven, leading to the development of unwanted pathways for the throughflow of both air and water through the cylinders.

Apart from coir matting, synthetic materials may be used, such as woven polyester in the form of fibrous matting. Preferably, the media material comprises thick, heavy fibres, of e.g polyester, which are matted and glued together to form a moulded pad or sheet. Characteristics such as porosity, permeability, fibre density, overall thickness, etc, can be easily controlled during manufacture. Such materials would not be expected to deteriorate or vary over time, when used as the material of the cylinders 54, 56. Preferably, the material should be water-absorbing (hydrophillic) in nature, to promote microbial growth (on the surface of the fibres).

Some further details of the preferred fibrous material may be understood from the following.

The material comprises synthetic fibres, free of toxic resins and glues. The overall density of the fibrous material is in the range 0.02 to 0.05 grams/cc. The thickness of the fibres is 400 to 800 denier. Most of the fibres should be five cm or longer.

The media material should have a water-holding capacity of 0.02 to 0.1 grams of water per cc of the material. This desired capacity may be alternatively regarded as one to four grams of water per gram of the fibrous material. The media material should also be selected for its air-permeability, which may be stated in that the pressure head differential that is needed in order to create a throughflow velocity of air of twenty cm/sec should be between two millimeters and ten mm of water. It will be understood that this pressure differential acts to urge the media-cylinders to collapse inwards, and the designers should see to it that the rotary-frame, and the manner in which the cylinder is mounted thereon, are robust enough to cope with that.

The air-permeability of the media material of the cylinders should be such that, given the dimensions of the apparatus, the power of the fan, etc, the air passes through the media material more or less evenly over the outside area of the cylinders. It would be a disadvantage if pathways of variable permeability were to develop through the media material. Of course, some pathways will inevitably develop, especially as plant roots become established in the material, but with careful attention to promoting evenness of airflow and water flow, and with careful selection of the plants for the evenness of their roots, it may be expected that the air permeability of the cylinders can be functionally uniform, over the whole area, for a long service life.

The media material of the cylinders should be inert, i.e inert with respect to the biological reactions associated with plant growth, and inert with respect to the microbiological breakdown reactions associated with airborne pollutants. The media should not be soil. The media should not be organic material that provides nutrients and resources directly for plant growth. The function of the media material is to provide mechanical support for the plants. The nutritional support for the plants is provided hydroponically, as described.

Preferably, user-accessible controls are provided in the cabinet 23, for controlling the speed of the fan 58, and for controlling the pressure of the water in the water supply pipe 38. The knob 73 is for controlling the setting of a pressure-regulator associated with the pump 43, and thereby for controlling the pressure of the water as it emerges from the perforations in the ring 38, and thereby for controlling the water flow rate.

It should be understood that pressurizing the water is not essential. However, the designers should indeed take care to ensure that the rate of water flow into the media cylinders is uniform all around the circumference of the cylinders. Allowing the water merely to drip and trickle down, under gravity, onto the cylinders is unlikely to procure circumferentially-uniform flowrates.

The designers should of course see to it that the water containers and conduits are adequately sealed, and that provision is made to minimize damage due to such spills as might inadvertently occur. Thus, a tube-drain 71 has been provided (FIG. 2) in case water should condense and collect inside the tube 27, for conveying the condensate into the reservoir 72. It will be understood that the configuration of the unit 20 is such that sealing the water, and also sealing the airflow, is easily accomplished, without having to resort to unconventional and costly seals and gaskets, even though the plant-carrying assembly is able to rotate.

The media cylinders 54, 56 as shown are right-cylindrical, which is the best shape for securing evenness of air and water flows. The term "cylinder" should be understood as including a media material that has been configured as almost right-cylindrical, but has a (small) conical component. The cylinders also need not be round; thus the cylinders may be of e.g square cross-section.

The airtube 27 serves as the main structural support for the above-table components of the unit. The tube 27 can be firmly secured by being glued into a flange, and then the flange is bolted to the table-top 25.

The cavity 41 inside the tube 27 serves as the suction plenum. The designers should aim, in setting the size and shape of the cavity 41, to create a plenum of such dimensions and configuration as to ensure there are no significant differences or gradients of pressure or flow velocity therewithin.

The air passing though the perforations 29 in the wall of the tube 27 typically is travelling at e.g two m/s or more. Indeed, one of the constraints on the power of the fan 58 is the avoidance of moving the air so quickly through the perforations 29 that occupants hear a whistling noise.

By contrast, typically, air passes through the medium (and over the roots) almost imperceptibly. The fan should be arranged to provide an airflow speed through the media material of between two and twenty cm/sec. Because of the geometry of the vault 65, the airspeed increases as the air moves through the vault from the inner cylinder 54, radially inwards towards the tube 27. Again, the designers should see to it that air cannot enter the vault 65, nor the cavity 41, without first having passed through the media material and over the roots of the plants.

The rotation of the media cylinders, and of the plants, is done about a vertical axis of rotation. The vertical axis is preferred for a number of reasons:

(a) The media being vertical (or nearly vertical) the plants protrude horizontally. The vertical axis means that even though the plants rotate, the plants always remain the same way up, mechanically. If the rotation was done about another axis, as the media/plants assembly rotated, gravity would exert a cyclically varying force tending to dislodge the roots from the media, whereby the plants would soon fall off.

(b) Also, the vertical axis means the media cylinders are easy to seal, especially at the bottom of the cylinders.

(c) Also, the vertical axis means that it is easy to ensure that water is fed into the media material all around the circumference of the cylinders, all at the same pressure head. It would be difficult to achieve uniformity of water feed into the whole circumference of the cylinders if the axis of the cylinders were other than vertical.

The mass of plants should be large enough to remove pollutants from the room-air at a greater rate than that at which new pollutants are added. Now, the unit cannot be expected to be effective to clean the air that lies many meters away from the unit, in a large room. Thus, for a large room, it would be better to provide two or more units, rather than to provide one large unit. As mentioned, the unit as described in FIG. 1 has an area of the media that is available for plants of two sq.meters. The practical minimum for the present unit would be one sq.m. Because of the large surface area that is inherently available in a cylindrical configuration, a plant area of two sq.m can easily be provided within a 60-cm.sq footprint. One such unit should be adequate for a windowed room of up to two hundred sq.m, which does not have powered ventilation, e.g a room in a house, or a 'stale' room in an office building.

Preferably, the flow of water should be continuous. The media cylinders, and the roots of the plants, should be subject to a constant trickle of water. The media, or rather the roots of the plants, should never be allowed to dry out, but should be kept constantly wet—in the manner of, and in accordance with the principles of, hydroponic cultivation. Of course, some water will be lost through evaporation, but the rate at which the water trickles through the media material, and over the plant roots, should be large enough that evaporation is minimized. If the evaporation rate were large, salts might or would be precipitated onto the media material and onto the roots of the plants. These salts come not only from the hardness of the water, but from the biological reactions associated with plant growth.

The constant movement of the water washes the salts out of the media material and out of the roots. The designer should ensure that the salts are carried away by the moving water. With careful design, the plant roots can be kept free of salts precipitation, over the long service life. The salts collect in the water in the storage reservoir 72, and periodically the tank should be emptied and the water replaced, as a routine service activity. Use of soft water with low dissolved salts as a feed stock will delay the build-up of salts in the unit.

As to on-going operation, the unit requires electricity to power the pump and fan. Make-up water is done by adding a single prepared bottle of water in response to a signal of low level in the reservoir 72.

The unit can be manufactured—and its powered systems, seals, etc, can be checked and tested, as required—on an in-factory basis. Typically, it is not practicable to install the plants in-factory, as that would require the hydroponic system to be kept in operation during shipping and while the unit is awaiting sale. Preferably, the factory-manufactured unit is shipped and stored for sale without plants, and the plants are not installed until the unit has been delivered and placed in the room in which it is to operate. The plants can be installed (by hand) into the cylinders while the cylinders remain in their operational position, i.e the cylinders do not need to be taken out of the unit for installation of the plants.

Various species of plants may be used in the unit 20. The plants should be such that they root evenly through the (inert) media material, and will support themselves mechanically with their roots embedded in vertical or near-vertical media material. The plants should be of the kind that do not grow very tall, and which stop growing larger, and do not spread unduly, once established. The plants should be of the kind that stay the same for long periods. The plants should be compatible with, and not overwhelm, each other. The plants should have roots that each fill up their own local area of the media material evenly, without spreading unduly, or clogging the media. Suitable plants include: ferns, orchids, especially such species as croton, ficus, syngonium, baby's tears, and the like.

Some of the volatile organic contaminants found indoors (such as e.g benzene and toluene) are similar in chemical structure to the aromatic plants, such as mint. Organic compounds having similar structures tend to be degraded by similar microbiological processes. Thus, it can be beneficial to include plants of the mint family (Lamiaceae) and other culinary herbs in the air cleansing unit described herein.

As mentioned, the designers should seek to ensure that the flowrate at which nutrient-water passes down through the media cylinders should be uniform around the whole circumference of the cylinders. As mentioned, the holes in the water distribution ring should be equi-sized and equi-spaced. Also, the water supplied to the holes should be under pressure. The pressure head (measured at the holes) should be at least ten cm of water. Lower than that, it becomes significantly more likely that the flow through hole-1 will be different from the flowrate through hole-2. The fact of pressurizing the water to a significant head makes it easier to ensure that the pressure is the same at all the holes in the ring 34.

The designers should ensure that the holes in the ring are small enough that the said significant pressure is required in order to procure the flowrate required for effective hydroponic operation. Again, if the unit were configured to procure the required flowrate at low pressure, the likelihood of uneven distribution of flow, especially e.g after a period of service, would be much increased. A pressure head of more than ten cm of water should suffice in most cases.

Figure 2:
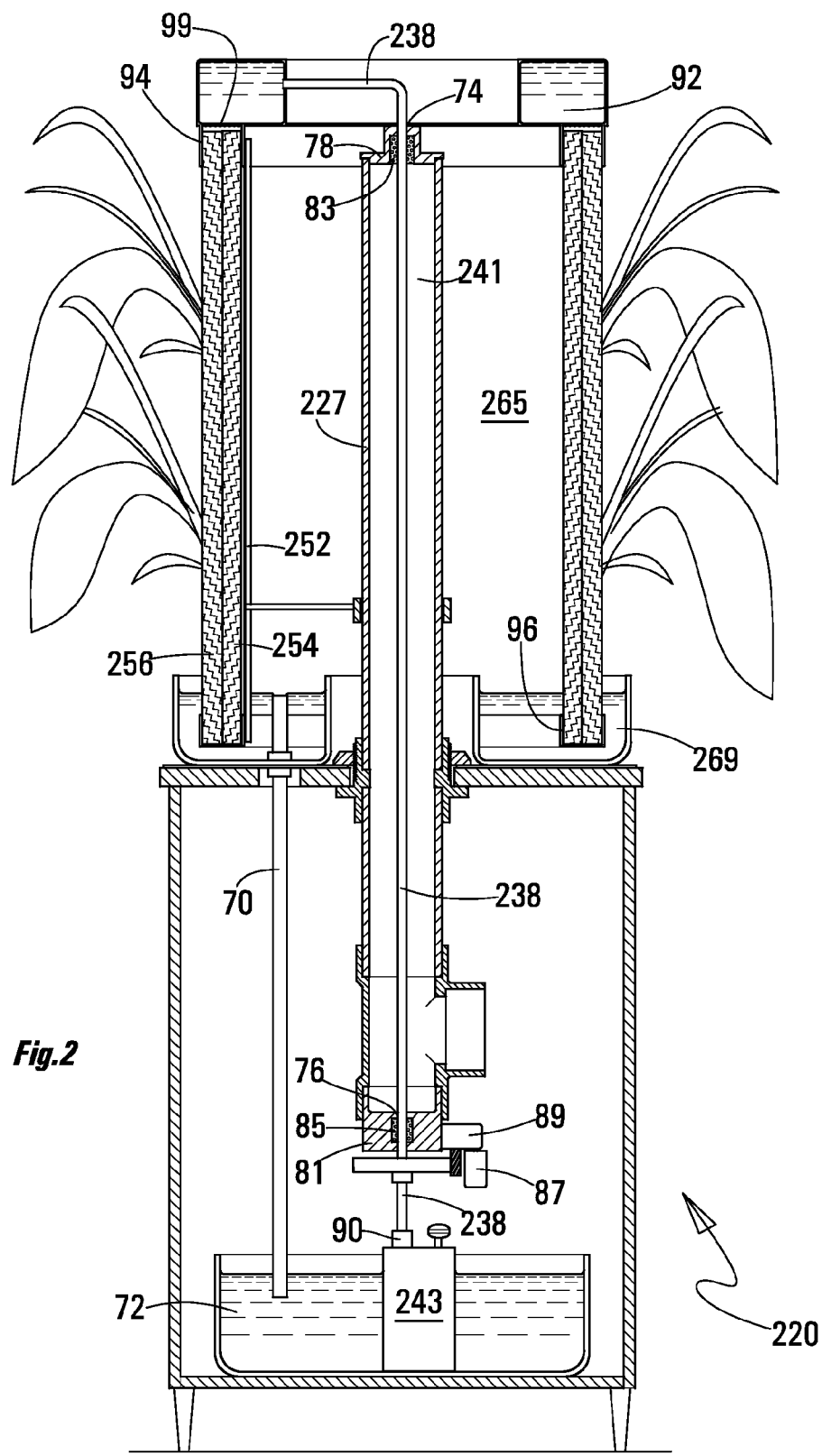
FIG. 2 is a sectioned side-elevation of an alternative in-room hydroponic air-cleansing unit.

In FIG. 2, the rotation of the media cylinders 254, 256 (together with the plants) has been motorized. The central fixed upright tube 227 is again firmly fixed to the table-top of the cabinet. In FIG. 2, the fan and airducts are not shown.

In FIG. 2, the water-supply pipe 238 rotates relative to the fixed upright tube 227. The pipe 238 is mounted in top and bottom bearings 74, 76 in top and bottom plugs 78, 81 of the tube 227. Air seals 83, 85 are also provided in the plugs 78, 81, to ensure that air cannot enter the cavity 241 other than through the perforations in the fixed tube 227.

The pipe 238 is driven to rotate by an electric motor 87. A gearbox 89 is fixed to the bottom plug 81, and creates the (slow) rotational speed required to drive the cylinders 254, 256. The rotating pipe 238 is coupled to the pressurized port 90 of an electric water pump 243.

At the top of the unit 220, the pipe 238 connects to a top cover. The top cover rests on, and rotates relative to, the top plug 78. The top cover incorporates an annular water tank 92, which is pressurized by the water pump 243. Perforations 244 in the floor of the tank 92 permit water to drain down and out, and to pass into the cylinders 254, 256. The tank 92 is voluminous enough to create a plenum (i.e to enclose a volume of fluid in which, though the fluid is moving, it is moving so slowly that no significant differences or gradients of pressure are present.)

Extending down from the floor of the tank is an annular channel 94, which is dimensioned to receive the media material of the two cylinders 254, 256. The media material being thus engaged, and pressurized water being present in the tank 92, the tops of the media cylinders are very effectively sealed, thereby preventing air from entering the annular vault 265 other than by permeating radially inwards through the media material. It is noted that the media cylinders 254, 256 and the top cover rotate in unison, i.e in FIG. 2 there is no relative movement between the cylinders and the top cover.

Water from the pressurized tank 92 trickles down the cylinders, wetting the roots of the plants. A corresponding annular bottom channel 96 receives the bottoms of the two cylinders 254, 256. The bottom channel 96, and the bottoms of the cylinders, lie below the level of the water in the collecting basin 269, whereby air is prevented from entering the vault 265 by passing underneath the cylinders.

The two channels 94, 96 are components of a rotor-frame that includes a hub, spokes, and upright bars 252, as was the case in FIG. 1. The channels 94, 96 are fixed (e.g bolted) to the bars. Also, the media cylinders 254, 256 are held in place by being bolted to the bars 252.

Figure 3:
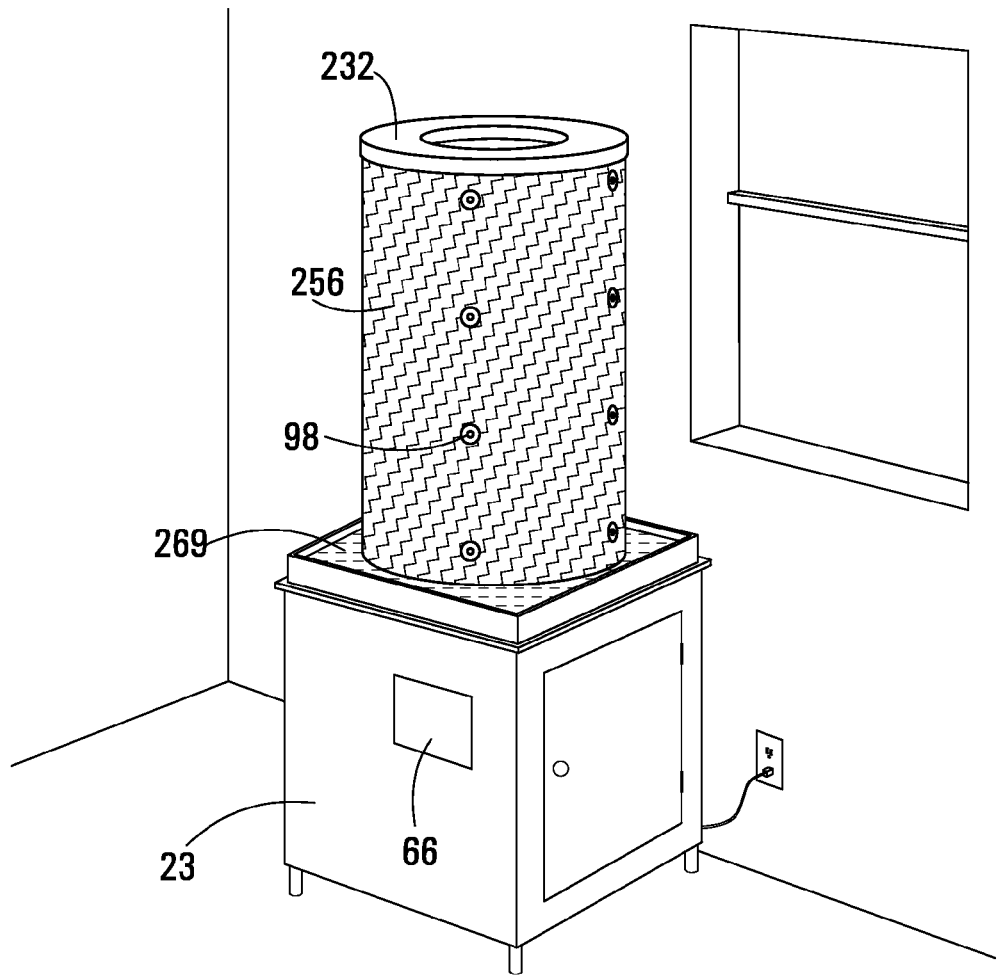
FIG. 3 is a pictorial view of the unit of FIG. 2.

FIG. 3 is a pictorial view of the unit of FIG. 2. The unit is plugged into mains electricity, but it is not intended that the unit be connected to mains water supply, nor to mains drains (although that is not ruled out). The plants are not shown in FIG. 3, but it is intended that the plants are illuminated by light from the window of the room. Also, it is expected that the artificial light that is available in the room will significantly supplement the natural light. Numeral 98 indicates the bolted fasteners by which the media cylinders are secured to the upright bars 252 of the rotary frame.

The basin 269 should be provided with an opaque cover, not least to deter algae growth in the nutrient-rich water, also to reduce evaporation.

In the FIG. 1 unit, rotation of the rotary assembly, and of the plants, is carried out by hand. However, preferably, the rotation should be powered, whereby the rotation can be controlled according to desirable parameters. As shown in FIG. 2, it is not difficult to incorporate an electric motor/gearbox into the unit, to perform the function of rotating the plants, and the motor can be programmed to create the desired movements. It is preferred that, at least in a room used for commercial business, the rotation should be powered, and preferably the rotation should under programmed control.

Whether the rotation regime is manual or powered, each plant cannot be so well illuminated (from a single window) as an individual plant in its own pot can be. In the present unit, in order for each plant to receive an equal share of the illumination, each plant has to spend a good part of the illumination time with the whole plant facing away from the source of light.

The rotation of the plants can be continuous at constant speed, or can be intermittent. The rotation can be done on an always-the-same-way basis, or can be done on a first-one-way-then-the-other basis. In the latter case, the rotation can be accommodated mechanically by twisting the pipes and conduits, thereby avoiding the need for rubbing-contact seals. On the other hand, as is plain from FIG. 2, rubbing-contact seals can be minimal and easy to engineer, in the unit, and can be preferred over conduits that are able to twist.

Plants thrive when exposed to bright-light and darkness alternating on a 24-hr cycle. In order to allow each plant in the unit to experience that daily cycle, the rotational speed should be such that each plant passes in front of the window at least twice per 24-hr period. If the speed is slower than twice per day, some plants will receive more light on mondays than on tuesdays; and even if the total light then averages out equally (between all the plants) on, say, a weekly basis, still it is better for all the plants if each day's exposure is the same, or nearly the same—i.e the same day by day, and the same plant by plant.

From the standpoint of evening out the brightness exposure among all the plants, the faster the speed of rotation the better. The faster the speed, the more evenly the plants experience the available light. On the other hand, sometimes the energy drawn by the rotation motor can be a factor, in which case sensors can be provided and the speed of rotation can be tailored to the intensity of light falling on the unit.

If the rotation is done at a constant slow speed, e.g just two or three revolutions per day, the rotation time (in hours) should not be a simple multiple of twenty-four, in order that the individual plants do not pass by the window always at the same time each day. The time of passing the window starts not to matter when the number of passes per day is larger—e.g five revolutions per day, or faster. (The rotation motor can be switched off during the hours of darkness, but the parameters mentioned herein assume constant rotation.)

On the other hand, the rotation of the plants would be too fast if the occupants were able to perceive that the plants are moving. Such perceived movement is, or might be, distracting to the occupants. For present purposes, if the rotation of the plants is once per half-hour (i.e forty-eight revs per day), or slower, the rotational movement of the plants is too slow to be distractingly perceptible to the occupants.

Thus, in order for the plants be evenly illuminated from a single window, and for the plants not to be perceived to move, the rotational speed should be between five revs and forty-eight revs per day. The preferred range is between ten revs and thirty revs per day. Again, the smaller the number of revs per day, the more important it becomes that the rotation period is not a simple multiple of twenty-four.

The rotation can be done more slowly, especially if the illumination in the room is better than just one small east-facing window. The more evenly, and the more brightly, the room is illuminated, the less important it is to secure evenness of illumination by rotating the plants. (If the room were illuminated equally over all sectors of the cylinders, the cylinders would not need to be rotated at all.)

With some species, it is not so important that the light-dark cycle be repeated once a day, each day the same. However, that is not to say that it would be acceptable if the rotation was so slow that the plants get, say, all their weekly illumination needs all in one day, once a week. The viability of the plants might be compromised under a rotation regime as slow as that.

This can be expressed algebraically. The speed of rotation is such that each plant receives its N-day's illumination needs all in one day, every Nth day. In the natural light-dark 24-hr cycle, N=1. Typically, even if a species can tolerate N=2 or N=3, for nearly all species N=5 marks the slowness point at which the illumination is becoming so skewed, day to day, that the viability of the plants starts to be compromised, if that slow rotation continues over a period of months or years. However, of course, if it is found that this or that species can tolerate a regime of being brightly-lit for one day and then in shade for six days, then the rotation can be slowed accordingly. However, no species is made actually more viable by making N a larger number than one.

The above relates to the source of light being a window of the room. The present unit could be used when only artificial (bright) light is available, but the main intent is that the unit be used in a room with a window—preferably a window that receives direct sunlight.

As shown, the room-air is drawn into the unit through the plants, through the media cylinders, radially inwards through the vault, through the perforations in the central tube, into the cavity inside the tube, through the conduits. and into the fan. From there, the treated air is discharged back into the room, through the grating 66. It will be understood that the fan could be configured to make the air flow the other way. That is to say, the room-air would be sucked in through the grating 66 and the treated air would be discharged back into the room upon emerging radially outwards through the media and through the foliage of the plants.

One or both of the water pump and the fan can alternatively be located in or on the top-cover, with suitable re-configuring of the pipes and conduits.

The unit described herein provides a means for packing a large area of plants into a small footprint, which minimizes the use of materials and resources required to achieve a given air-cleaning performance level, and which can be expected to have a long trouble-free service life. The cylindrical configuration makes it easy to draw the air flow evenly into and through the plants, even though the area is so large. The air flow might be uneven due to the uneven proximity of furniture or the walls of the room, but that fact is compensated for by the fact of rotation. The vault 65 is configured for radial flow of air, whereby the air velocity at the centre is much greater than the velocity through the plants. The higher velocity through the perforations 29 makes it easier to procure the required evenness of flow, while the slow speed through the media material means that the air has a good dwell-time in contact with the roots of the plants.

Some of the physical features of the apparatuses depicted herein have been depicted in just one apparatus. That is to say, not all options have been depicted of all the features. Skilled designers should understand the intent that depicted features can be included or substituted optionally in others of the depicted apparatuses, where that is physically possible.

For present purposes, a right circular cylinder is a cylinder generated by the revolution of a rectangle about one of its sides, the axis thereof being the line of the one side. It is noted that the word "cylinder" can refer, herein, to a cylinder that is of other than circular cross-sectional form. Also, the word "cylinder" can refer, herein, to a cylinder that is of (slightly) tapering or conical form. In fact, it can be beneficial for the media cylinders to be deliberately made slightly-but-perceptibly conical; whereupon the outer surface could still be called "vertical". However, as to the rotational axis of the media-cylinder, that should be as nearly perfectly vertical as careful setup of the unit permits.

Terms used herein that define respective theoretical constructs, are intended to be construed according to the purposive construction.

The scope of the patent protection sought herein is defined by the accompanying claims. The apparatuses and procedures shown in the accompanying drawings and described herein are examples.

The numerals used in the drawings are listed as:
20,220 air-cleansing unit
23 floor-standing cabinet
25 table-top
27 fixed upright tube
29 air-holes/perforations in wall of tube 27
32 top cover
34 water distribution ring
36 ring hangers
38,238 water supply pipe
41 hollow interior cavity of tube 27
43,243 electric water pump
49 hubs
50 spokes
52,252 upright bars
54,254 inner cylinder (of inert root-retaining media material)
56,256 outer cylinder (of inert root-retaining media material)
58 electric fan
61 air ducts
63 air inlet port of fan 58
65,265 annular vault between media cylinder 54 and tube 27
66 treated air discharge grating
67 rubber sealing strip
69,269 water-collecting basin
70 basin drain-pipe
71 tube-drain
72 storage reservoir
73 water pressure regulator control knob
74 top bearing
76 bottom bearing
78 top plug
81 bottom plug
83 top air seal
85 bottom air seal
87 electric motor
89 gearbox
90 outlet port of pump
92 annular water tank
94 top channel
96 bottom channel
98 bolted fasteners
99 perforations in floor of pressurized water tank 92

The invention claimed is:

1. A hydroponic air-cleansing unit, wherein:
the unit is structured for placement in a room in a building, and for cleansing the air in the room;
the unit includes media-material, which is disposed in a vertical hydroponic configuration, in that the media-material:
 (a) is of sheet-form, being of large area and small thickness;
 (b) is disposed as a substantially-vertical sheet;
 (c) is configured to form a wall of a media-cylinder;
 (d) is porous, and is permeable to throughflow of air and throughflow of water;
 (e) is of such nature that roots of plants can be embedded in the media-material, whereupon the media-material provides mechanical support for the plants;
the unit includes a powered water-pump, which feeds hydroponic water into the top of the media-cylinder, whereby the water passes down through the media-material, and wets the roots of plants embedded in the media-material;
the unit includes a powered air-pump or fan, which forces room-air to permeate radially through the media-material, and to pass over the roots of the plants embedded in the media-material;
the wall of the media-cylinder defines a hollow interior vault between said media cylinder and a fixed frame, positioned centrally;
the unit includes an upper-vault seal and a lower-vault seal;
the seals are effective to seal the vault in such manner that air cannot move between the room and the vault except by passing through the media-material;
the unit includes a rotary-frame;

the rotary-frame is mounted for rotation with respect to the fixed-frame;
the rotation is about a vertical axis;
the media-cylinder is fixed to the rotary-frame, such that the media-cylinder is rotatable in unison with the rotary-frame;
the rotary-frame, the media-cylinder, and plants embedded in the media-material, are integrated components of a rotary-assembly;
the structure of the unit, and the manner of rotation, are such that, when plants are embedded in the media-cylinder, and when the unit is placed in a room having a point source of light, the plants can be exposed equally to that source.

2. A hydroponic air-cleansing unit as claimed in claim 1, wherein the unit includes a central tube, which:
defines a hollow interior cavity, connected by air-conduits to the powered air-pump.

3. A hydroponic air-cleansing unit as claimed in claim 2, wherein the central tube has apertures, through which air can move between the vault and the cavity.

4. A hydroponic air-cleansing unit as claimed in claim 3, wherein the central tube is a fixed component of the fixed frame.

5. A hydroponic air-cleansing unit as claimed in claim 4, wherein:
the unit includes a thrust-bearing that acts between the rotary-frame and the central tube;
the unit is so arranged that the thrust bearing transfers the weight of the rotary-assembly directly to the central tube.

6. A hydroponic air-cleansing unit as claimed in claim 3, wherein:
the upper-vault-seal seals the media-cylinder with respect to the fixed-frame;
the fixed-frame includes a rotary-roof-component of the rotary-frame, which overlies the media-cylinder;
the upper-vault-seal seals the roof-component with respect to the central-tube;
the rotary roof-component of the rotary-frame is formed with a channel;
the media-material that forms the wall of the media-cylinder is:
(a) located in the channel; and
(b) is sealed with respect to the channel by being a tight fit in the channel.

7. A hydroponic air-cleansing unit as claimed in claim 3, wherein:
the central tube has a vertical axis and includes rotary bearings, upon which the rotary-frame is mechanically supported for rotation.

8. A hydroponic air-cleansing unit as claimed in claim 3, wherein:
the apertures in the central tube comprise many small air-holes through the wall of the central tube;
the air-holes are arranged in a regular pattern, arranged for evenness of radial airflow through all sectors of the vault;
the size of the air-holes is such that the pressure drop through the holes, as air passes between the vault and the cavity, is at least eight mm of water.

9. A hydroponic air-cleansing unit as claimed in claim 1, wherein:
the upper-vault-seal seals the media-cylinder with respect to the fixed-frame;
the fixed-frame includes a fixed-roof-component of the fixed-frame, which overlies the media-cylinder;

the upper-vault-seal is comprised in that an elastomeric seal:
(a) is fixed with respect to the rotary frame;
(b) is sealed with respect to the media-cylinder;
(c) makes rubbing sealing contact with respect to the roof-component.

10. A hydroponic air-cleansing unit as claimed in claim 1, wherein:
the unit includes water nozzles, which are positioned for delivering hydroponic water from the water-pump down on top of the media-material of the wall of the media-cylinder, evenly around the circumference of the media-cylinder;
the unit includes a water conduit for conveying hydroponic water from the water-pump to the nozzles;
the water-pump is set so that the water, immediately prior to passing through the nozzles, is at a pressure head of at least ten cm;
the water-pump is a component of the fixed frame; and either
(a) the water nozzles are integral a rotary roof component of the rotary frame, and the water conduit includes a fixed-conduit and rotary-conduit, and includes a sealed rotary joint between the two; or
(b) the water nozzles are integral with a fixed roof component of the fixed-frame.

11. A hydroponic air-cleansing unit as claimed in claim 1, wherein the plants form a continuous circumference over the outer surface of the media-cylinder, substantially without gaps.

12. A hydroponic air-cleansing unit as claimed in claim 1, wherein:
the media-material has a water-holding capacity of 0.02 to 0.1 grams of water per cc of the material;
the media material has an air-permeability such that the pressure head drop that is needed in order to create a velocity of air through the media-material of twenty cm/sec is between two millimeters and ten mm of water.

13. A hydroponic air-cleansing unit as claimed in claim 1, wherein:
the rotary-frame includes a hub, spokes, and upright bars;
the unit includes fixing bolts that pass through the media material and though holes in the bars, whereby the wall of the media-cylinder is fixed to the bars;
the hub is a loose fit on the fixed tube, and a rotary journal bearing is formed between the tube and the rotary-frame, by the fit of the hub to the tube.

14. A hydroponic air-cleansing unit as claimed in claim 1, wherein the wall of the media-cylinder comprises two sheets of the media-material, configured as two cylinders, one inside, and in contact with, the other.

15. A hydroponic air-cleansing unit as claimed in claim 1, wherein the air-pump or fan drives the air in the radially-inwards direction with respect to the vault.

16. A hydroponic air-cleansing unit as claimed in claim 1, wherein:
the unit includes a rotation-motor, which drives the media-cylinder to rotate;
the media-cylinder is driven to rotate at a speed of between five and forty-eight revolutions per day.

17. A hydroponic air-cleansing unit as claimed in claim 1, wherein the media-material is inert with respect to plants and hydroponic water.

18. A hydroponic air-cleansing unit as claimed in claim 1 in combination with a room, wherein a point-source of light is a window of the room.

19. A hydroponic air-cleansing unit as claimed in claim 1, wherein:
  the lower-vault-seal seals the media-cylinder with respect to the fixed-frame;
  the fixed-frame includes a water collecting basin;
  the basin is located underneath the media-cylinder;
  the lower-vault-seal is comprised in that the unit is structured to maintain a level of water in the basin, and the media-cylinder is sealed at the bottom by dipping in the water in the basin;
  thereby preventing air from moving between the room and the vault by passing underneath the media-cylinder.

* * * * *